UNITED STATES PATENT OFFICE.

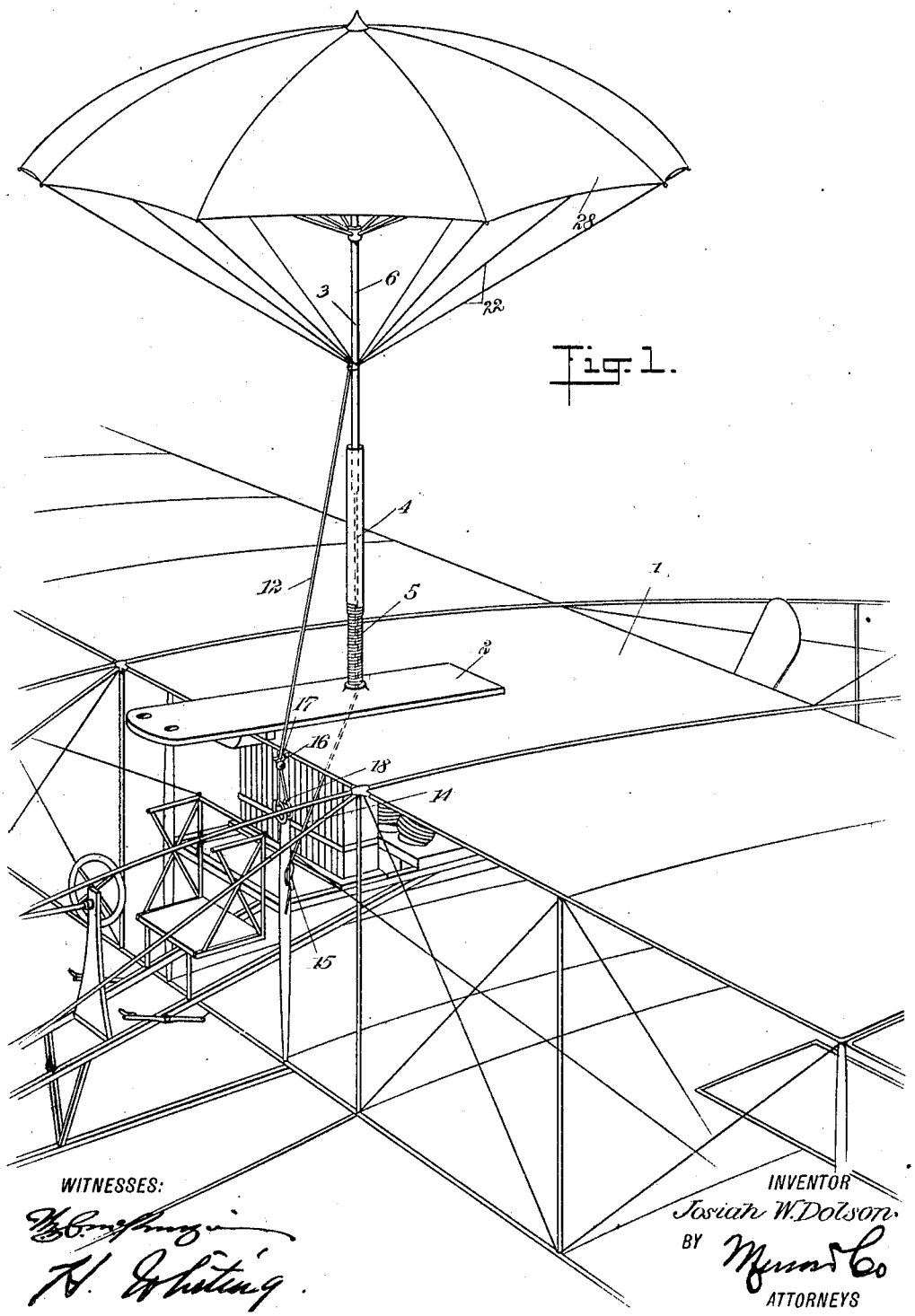

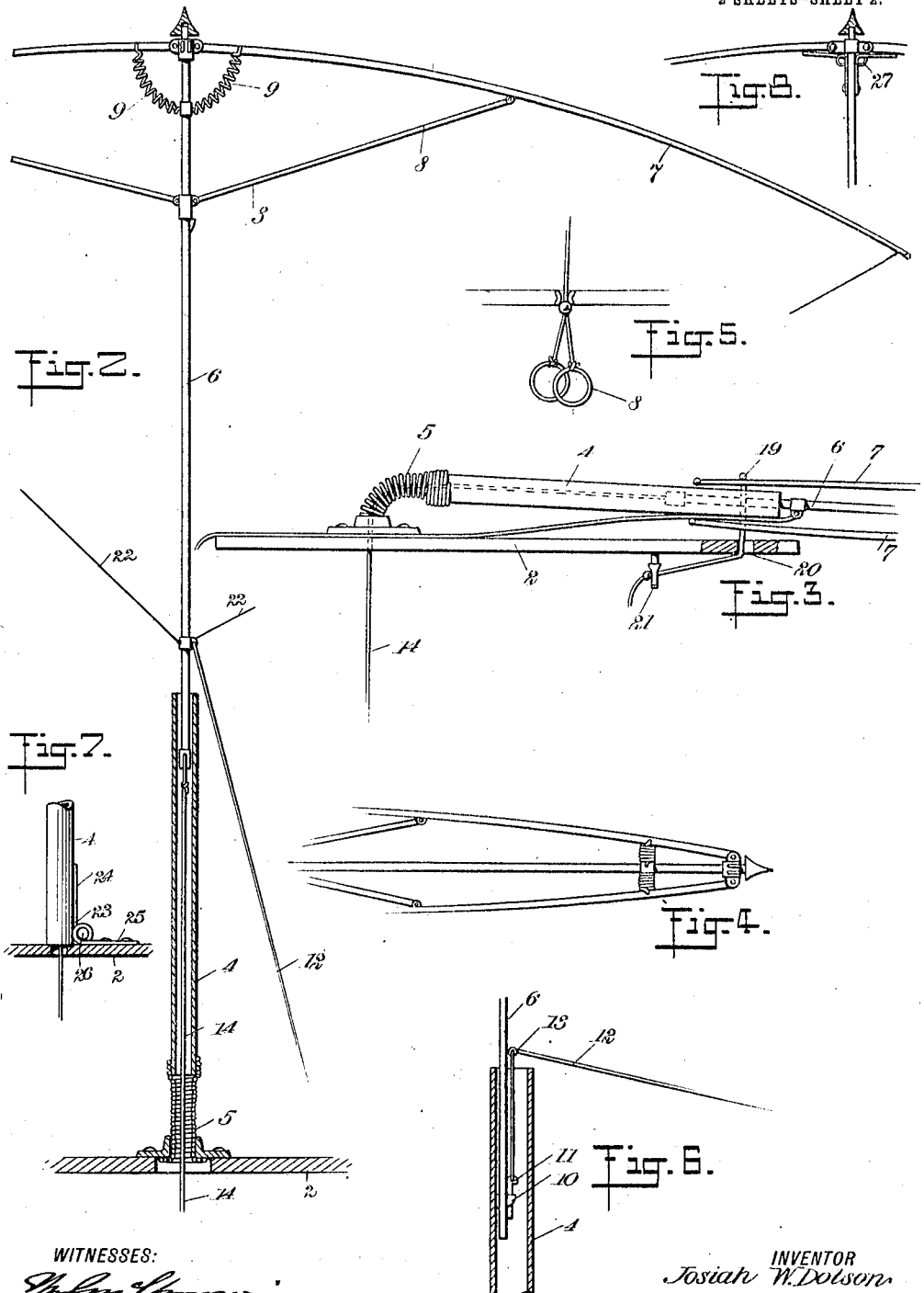

JOSIAH W. DOLSON, OF NEW YORK, N. Y.

FLYING-MACHINE PARACHUTE.

1,003,714.   Specification of Letters Patent.   Patented Sept. 19, 1911.

Application filed April 7, 1911. Serial No. 619,534.

*To all whom it may concern:*

Be it known that I, JOSIAH W. DOLSON, a citizen of the United States, and a resident of the city of New York, borough of Manhattan, in the county and State of New York, have invented a new and Improved Flying-Machine Parachute, of which the following is a full, clear, and exact description.
This invention relates to a new and improved parachute to be used in connection with flying machines of the heavier-than-air type, commonly known as aeroplanes.

In the majority of deaths and other accidents which have happened recently in connection with aeroplanes, the destruction to life and limb was due to the fact that when the aeroplane turned turtle or fell to the ground, for any reason, the aviator was unable to get away from the flying machine and support himself in the air, and of necessity fell to the ground and was injured.

It is therefore an object of this invention to provide a parachute for a flying machine which will correspond to a lifeboat on a water vessel, and enable the aviator to detach himself safely from the aeroplane in case of accident to the latter.

A further object of this invention is to provide an aeroplane with one or more parachutes, which, when not in use can be collapsed out of the way, in a position where they will offer least resistance to the flight of the machine, and yet so constructed and connected that they can be readily extended and opened, and in fact, detached, so as to support the aviator in the air and allow him to reach the ground in safety.

A still further object of this invention is to provide a parachute which may be extended and let out any desired distance from the aeroplane, so as to aid in supporting the same, if necessary, and to act as an air anchor.
These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a perspective view showing my device attached to an aeroplane and in its extended and open position; Fig. 2 is an enlarged detail view, partly in section, showing the parachute erected and open; Fig. 3 is a fragmentary view, partly in section, showing the parachute in its reclining closed position; Fig. 4 is a diagrammatic view showing the relative position of the ribs and springs of the parachute when the latter is closed; Fig. 5 is a fragmentary view of one type of lock for securing the flexible connections; Fig. 6 is a fragmentary section of a modified form of means for securing the parachute to the flying machine; Fig. 7 is a fragmentary view of a modified form of hinge connection between the bracket and the support on the flying machine; and Fig. 8 is a fragmentary view showing a modified form of spring hinge connection between the ribs and the rod.

Referring more particularly to the separate parts of the invention as embodied in the forms shown in the drawings, 1 indicates an aeroplane, which may be of any suitable type, to which my device is shown as attached. In this instance, I have shown a support 2 in the nature of a flat plank, secured to the top of the aeroplane, which forms the base for attaching the parachute to the flying machine. It is desirable that the parachute, which is indicated at 3, may be attached to the support 2, and thus to the flying machine in such a manner that it can be held in an erect position, as indicated in Fig. 1, when it is desired to use the same, and that it also can be collapsed out of the way and laid down along the top of the aeroplane in the position indicated in Fig. 3. This may be done in any suitable manner. I prefer, however, to provide a bracket 4, which is shown in the nature of a tube, and is adjustably connected to the support 2 in any manner suitable to automatically erect the bracket, and thus the parachute, when the securing means therefor is released. I have shown one means of accomplishing this purpose, which consists in providing a spiral spring 5, formed tubular, so as to form an extension of the bracket 4, and secured at its upper end to the bracket, and at its lower end to the support 2, in alinement with an opening therethrough.

The parachute proper 3 may be of any suitable structure, but is preferably provided with a rod 6, which may slide into the bracket 4. Pivotally connected to the rod

6, adjacent the top thereof, there are provided a plurality of ribs 7, which radiate therefrom, and are reinforced and securely tied to the rod 6 by braces 8, which prevent the inversion of the parachute when in use. The ribs 7 are covered with any suitable fabric or web, indicated at 28, so as to form an umbrella-like structure when open, which will catch the air and permit the aviator to float slowly to the ground in safety.

It is preferred that the parachute should open automatically, and for this purpose, I have provided one or more springs 9, which are so arranged that they can be collapsed under tension, into the position indicated in Fig. 4, from which position, however, they will automatically expand and open out into the position indicated in Fig. 2, whereby they will automatically spread the parachute.

The parachute 3 may be held to the bracket 4 in any suitable manner, and I have shown two means for accomplishing this purpose. In the form shown in Fig. 6, the rod is provided with an opening, by which it engages over a lug 10 on the bracket 4, which lug is curved so as to permit the ready release of the rod and parachute. For securing the rod 6 on the parachute, I provide in this instance a bolt 11, which is connected to a take-off flexible connection 12, which may be of any suitable character, such as a rope, chain, or cable. This take-off connection is shown as passing through an eyelet 13, so that when the aviator desires to release the parachute, he can pull on the take-off connection 12, thus pulling out the bolt 11 and releasing the parachute, at the same time holding on to the take-off rope, so that he will be supported by the parachute.

Another and preferred form for securing the parachute to the flying machine is to provide a flexible connection 14, which may be of any suitable character, such as a chain, rope or cable, and is in the nature of a tie for securing the parachute to the flying machine. One end of the tie or flexible connection 14 is secured to the lower end of the rod 6 and extends through the tubular bracket 4, the tubular spring 5, and to a point on the flying machine located so as to be convenient to the aviator, where it may be secured in any suitable manner, as by means of a cleat 15. In this instance, the take-off connection, here also indicated by the numeral 12, is secured to the rod 6 at any suitable point. The opposite end of the take-off rope 12 may be secured in any suitable manner, as by means of an enlargement 16 thereon passing beyond the slotted cleat 17. Any suitable means for furnishing a secure grip of the take-off rope may be provided so that the aviator will have no difficulty in suspending himself from the parachute, as for example, the hand rings 18.

For the purpose of securing the parachute in its collapsed position and in close juxtaposition to the flying machine out of the air, any suitable means may be used, such as a loop lock 19 passing around the ends of the ribs and around the bracket 4, and then passing through one or more openings 20 in the support 2, to a point where the ends of the loop may be secured in any suitable manner, as by means of a grooved cleat 21.

It may be sometimes necessary to add to the strength of the parachute by tying the ends of the ribs 7 to the rod 6 by means of flexible connections 22, which radiate from the ribs to the rod. These connections may be used in place of the braces 8, or in addition to the braces 8.

In Fig. 7 is shown a preferred form of spring hinge connection of the bracket 4 with the support 2. In this case, there is used a spring hinge 23 similar to that used on swinging doors, with the leaves 24 and 25 secured respectively to the bracket 4 and the support 2. This hinge is provided with a spring wound around its pivot, at 26, with a tension tending to normally raise the bracket into its upright position, or permit it to be folded down into a horizontal position corresponding to that shown in Fig. 4.

In Fig. 8 is shown a modified form of connection of the ribs with the rod, which consists in providing spring latches 27, which are adapted to permit the collapsing of the ribs close on to the rod, but yet normally tending to expand or spread out these ribs away from the rod.

The operation of the device will be readily understood when taken in connection with the above description. When the aeroplane is flying along under normal conditions, the parachute will be collapsed in its depressed condition, as indicated in Fig. 3, with the top end thereof facing in the direction of flight, so as to offer little or no resistance to the air through which the aeroplane is rushing. If for any reason it should be desired to use the parachute, the loop lock 19 can be readily released by pulling the ends thereof out of the cleat 21, when the spring 5 will automatically act, swinging the parachute into an erect position. When the parachute has reached its erect position, and even during its upward movement, the springs 9 will act so as to spread out the ribs 7, and thus transform the collapsed parachute into an open or spread one. If the form of means for securing the parachute to the flying machine, such as that shown in Fig. 6, is used, and it is desired to make a get-away from the flying machine, it is merely necessary to pull on the take-off connection 12, when the bolt 11 will be released, thus releasing the parachute. If the form shown in the remaining figures is used, it is merely necessary to release the secured end of the tie 14, when the aviator can, by releasing the secured take-off rope or connection 12, suspend himself from the parachute, and thus glide safely to the earth, irrespective of the downward plunge of the aeroplane. It may be desired, however, in many instances, to merely let out the parachute, when spread out, to a suitable distance from the aeroplane, to act as a support or an air anchor. In this instance, the tie 14 is released and let out the desired amount, and then secured.

It will thus be seen that there is provided a new and improved parachute attachment for an aeroplane, which may be used to act either as an air anchor, or in the manner of a lifeboat, to save the aviator from bodily injury.

While I have shown two embodiments of my invention, I do not wish to be limited to the specific details thereof, but desire to be protected in various changes, alterations and modifications which may come within the scope of the appended claims.

Having thus described my invention, I claim as new and desire to secure by Letters Patent:—

1. The combination with an aeroplane, of a parachute, a lock for securing said parachute normally in a collapsed position in close juxtaposition to said aeroplane, means for automatically erecting said parachute when said lock is released, means for automatically spreading said parachute when said lock is released, means for detachably connecting said parachute to said aeroplane, and a take-off connection, for supporting an aviator, secured to said parachute.

2. The combination with an aeroplane, of a parachute, a lock for securing said parachute normally in a collapsed position in close juxtaposition to said aeroplane, means for automatically erecting said parachute when said lock is released, means for automatically spreading said parachute when said lock is released, means for detachably connecting said parachute to said aeroplane, a take-off connection, for supporting an aviator, secured to said parachute, and means for securing said take-off connection to said aeroplane.

3. The combination with an aeroplane, of a spring connected to said aeroplane, a bracket connected to said spring, and a parachute connected to said bracket, said spring being adapted to yield so as to permit said parachute to occupy a position in close juxtaposition to said aeroplane, but normally tending to erect said parachute.

4. The combination with an aeroplane, of a spring connected to said aeroplane, a bracket connected to said spring, a parachute connected to said bracket, said spring being adapted to yield so as to permit said parachute to occupy a position in close juxtaposition to said aeroplane, but normally tending to erect said parachute, and a lock for securing said parachute in its position in close juxtaposition to said aeroplane.

5. The combination with an aeroplane, of a tubular spring secured to said aeroplane, a tubular bracket secured to said spring, a parachute, having a portion thereof extending into said bracket, and a tie extending through said bracket and through said spring, for securing said parachute to said aeroplane.

6. The combination with an aeroplane, of a tubular spring secured to said aeroplane, a tubular bracket secured to said spring, a parachute, having a portion thereof extending into said bracket, a tie extending through said bracket and through said spring, for securing said parachute to said aeroplane, and a take-off rope secured to said parachute and extending outside of said bracket.

7. The combination with an aeroplane, of a tubular spring secured to said aeroplane, a tubular bracket secured to said spring, a parachute, having a portion thereof extending into said bracket, a tie extending through said bracket and through said spring, for securing said parachute to said aeroplane, a take-off rope secured to said parachute and extending outside of said bracket, and spring means for automatically spreading said parachute.

8. The combination with an aeroplane, of a parachute for said aeroplane, a lock for securing said parachute normally in a collapsed position in close juxtaposition to said aeroplane, means for automatically erecting said parachute when said lock is released, means for detachably connecting said parachute to said areoplane, and a take-off connection for supporting an aviator, secured to said parachute.

In testimony whereof I have signed my name to this specification in the presence of two subscribing witnesses.

JOSIAH W. DOLSON.

Witnesses:
  H. WHITING,
  J. P. DAVIS.